(12) United States Patent
Daniali

(10) Patent No.: US 11,570,419 B2
(45) Date of Patent: Jan. 31, 2023

(54) TELEMATICS AND ENVIRONMENTAL DATA OF LIVE EVENTS IN AN EXTENDED REALITY ENVIRONMENT

(71) Applicant: T-Mobile USA, Inc., Bellevue, WA (US)

(72) Inventor: Ali Daniali, Lynnwood, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/386,863

(22) Filed: Jul. 28, 2021

(65) Prior Publication Data

US 2022/0060673 A1  Feb. 24, 2022

Related U.S. Application Data

(60) Provisional application No. 63/069,402, filed on Aug. 24, 2020.

(51) Int. Cl.
| | |
|---|---|
| H04N 13/194 | (2018.01) |
| H04N 13/161 | (2018.01) |
| H04N 19/597 | (2014.01) |
| H04N 21/2187 | (2011.01) |
| H04N 21/2343 | (2011.01) |

(52) U.S. Cl.
CPC ........ H04N 13/194 (2018.05); H04N 13/161 (2018.05); H04N 19/597 (2014.11); H04N 21/2187 (2013.01)

(58) Field of Classification Search
None
See application file for complete search history.

(56) References Cited

U.S. PATENT DOCUMENTS

| | | | |
|---|---|---|---|
| 2015/0172343 A1* | 6/2015 | Pantos | G06F 16/182 709/219 |
| 2016/0041998 A1* | 2/2016 | Hall | G06F 16/7867 707/725 |
| 2020/0162765 A1* | 5/2020 | Lv | H04N 21/4516 |
| 2021/0329214 A1* | 10/2021 | Oh | H04N 13/194 |

* cited by examiner

*Primary Examiner* — Christopher Braniff
(74) *Attorney, Agent, or Firm* — Han Santos, PLLC

(57) ABSTRACT

Techniques are described herein for delivering telematic and environmental data of live events to provide immersive experiences. In one aspect, the techniques include receiving a multimedia data stream of a live event at an encoder comprising one or more codecs from one or more user devices. The multimedia data stream is compressed via the one or more codecs to generate a compressed multimedia data stream. Upon receiving a request from a playback device, the compressed multimedia data stream is transmitted to a decoder comprising the one or more codecs to serve the playback device.

20 Claims, 4 Drawing Sheets

TELEMATICS AND ENVIRONMENTAL DATA OF LIVE EVENTS IN AN EXTENDED REALITY ENVIRONMENT

CROSS-REFERENCE TO RELATED PATENT APPLICATION

This application claims priority to U.S. Provisional Patent Application No. 63/069,402, filed on Aug. 24, 2020, and entitled "File Format for Telematic and Environmental Data of Live events," which is hereby incorporated by reference in its entirety.

BACKGROUND

Communication systems that operate to provide an immersive user experience have been under continual development for many years. The immersive user experiences may vary in levels of manipulating activity. Some experiences may provide little augmentation, while others replace the real world in its entirety. A virtual environment, an augmented environment, or a combination of both based on real data obtained from a real-world environment are presented to a user that is operating a user device. For the sake of clarity, a pseudo-acronym "XR" or extended reality has been defined to represent a plurality of different modes that application users may experience virtual reality. For example, XR modes may include a Virtual Reality (VR) mode, an Augmented Reality (AR) mode, and a Mixed Reality (MR) mode.

To provide an immersive experience, a live event from a real-world location may be recorded. Data from the live event may be transmitted from the real-world location to another location to be reconstructed with or without augmented components and played back for consumption by a user via virtual reality-enabled computing systems. However, the presentation of such immersive user experiences may strain the bandwidth and processing limitations for many communication systems as video data and other data such as spatial data, positional tracking data, and other environmental data may be transmitted from one location to another location to enhance immersive user experiences.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Figure 1:
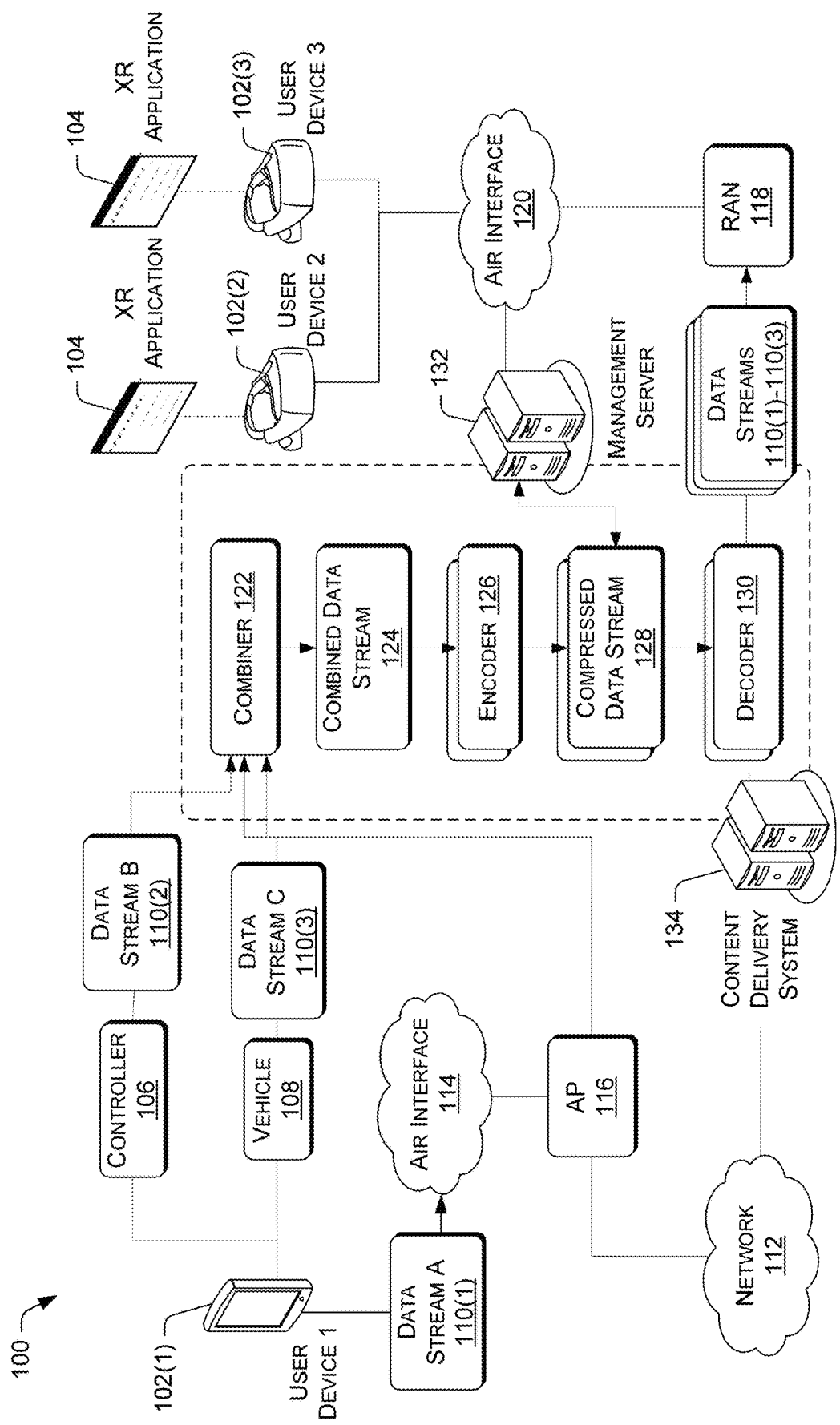
FIG. 1 illustrates an example of a network architecture for encoding and decoding telematic and environmental data of live events.

This disclosure is directed to techniques for encoding and decoding real world data collected during live events for providing enhanced immersive experiences in real-time. Recording of a live event from a perspective of a user in one location may include data that is associated with both physical world and virtual world interactions. In some aspects, video data, audio data, spatial data, telematics data, and/or other environmental data may be recorded via a computing device, a wearable device (e.g., ahead-mounted device (HMD), smartwatch, etc.), a mobile device (e.g., phone, controller, etc.), sensors, spatial devices, and/or other user devices.

In one example, the data that is associated with the physical world may include video data and audio data. Accordingly, a user device may comprise a camera and a microphone for capturing images and sound from a live event. In some aspects, the images may be captured from a user's viewpoint as the camera may be worn on the user. The user device may also be configured to collect six degrees of freedom (six-dof) data and gyroscopic data. For instance, the user device may comprise a three-dimensional (3D) coordinate measuring system that includes a six-dof unit to detect user input and interpret movements (e.g., left, right, forward, backward, up, down) and/or rotations (e.g., yaw, pitch, roll). The 3D coordinate measuring system may interface with a touch-sensitive input device or a touchless user interface (TUI) device that may be a component of the user device. In some aspects, the 3D coordinate measuring system may also determine the relative positions among one or more user devices.

In some examples, the user may operate vehicles (e.g., cars trucks, motorcycles, motorbikes, scooters, boats, recreational vehicles, or any other type of vehicle capable of being operated or driven by a vehicle operator), equipment, machinery, instruments, and/or so forth. Accordingly, the data that is associated with the physical world may also include vehicle telematics data. The vehicle telematics data may comprise vehicle operation data or behavioral data such as speed, lateral and longitudinal acceleration, vehicle wheel or engine revolutions per minute (RPM), steering data, throttle data, video and/or audio data collected by a camera or other type of recording device, or other data associated with vehicle operation, such as trip-based data such as GPS location, time of day, day of the week, road conditions, weather, or other information about the trip. Accordingly, the vehicle may be equipped with sensors capable of detecting and storing one or more of the various types of telematics data. For instance, the sensors may comprise an accelerometer for measuring the acceleration of the vehicle. The sensors may also be configured to interface with other user devices for transmitting the telematics data.

Data streams including the recorded video data, audio data, spatial data, and telematics data from one or more user devices may be transmitted to a server with a codec circuit. The codec circuit may comprise an encoder. The encoder may apply codec functionality that may compress and convert the data steam of a live event from an analog form to a digital form for transmission, storage, or encryption. The compressed data stream may be transmitted to a decoder, which may include codec functionality to decompress the compressed data stream for playback via a playback device such as an XR-enabled computing device (e.g., simulator devices, head-mounted devices (HMD), etc.) that may be operated by an additional user. The additional user may not be physically present at the real-world location in which the live event is recorded. Accordingly, the live event may be played back to provide an immersive experience via the playback device in different locations.

The playback device may generally comprise a central processing unit (CPU) and graphics processing unit (GPU) that may be configured to execute an XR-enabled application to provide XR experiences within a virtual environment representing a real-world environment. The playback device may be configured to communicate with the server that may be a component of a content delivery network. The server may be configured to stream the recorded data stream to the playback device or a mobile access terminal that is associated with a request for playback.

In some aspects, the encoder may apply codec functionality to compress the data stream from the live event and transmit the compressed data stream to a management server. The management server may, after locating a database table entry, forward the compressed data stream to the decoder that is operatively connected to the playback device that requests playback of the live event in an XR environment. Accordingly, a source user device may not address the data stream to a specific destination playback device and may rely on the management server to handle the forwarding of the compressed data stream. Additionally, the user device may record the live event in one format and the playback device that later plays the live event may use a different format. In this regard, the management server may transcode the data stream from the format in which the content was received from the source user device to the format compatible with the destination playback device.

In some aspects, the compressed data stream may be transmitted to a decoder, which may include codec functionality to decode the compressed data stream for playback via multiple playback devices. In this way, multiple users may be provided with an immersive experience based on the same live event. The multiple playback devices may be grouped into a group profile. Accordingly, the user device, when sending uploads of data streams to the management server, may specify a group profile instead of having to name specific media local area networks as destinations. Using profiles to designate a grouping of recipient playback devices instead of individually listing recipient playback devices or their associated bridging devices in a database table containing mappings may improve the speed of content delivery and more efficiently use management server processing and memory capacity.

The techniques described herein may be implemented in a number of ways. Example implementations are provided below with reference to the following figures.

Exemplary Network Architecture

FIG. 1 illustrates an example of a network architecture for encoding and decoding telematic and environmental data of live events. The architecture 100 includes one or more user devices 102(1)-102(3) that may provide XR-enabled functions. Though illustrated as mobile phones, the user devices 102(1)-102(3) may take various forms including personal digital assistants (PDAs), a mobile handset, a wireless mobile device, a mobile computer, a tablet computer, a laptop, a digital camera, a handheld gaming device or a controller, a wearable device (e.g., a head-mounted device (HMD) with goggles, lenses, glasses, smartwatch, etc.), a spatial device, vehicles, equipment, or other electronic devices having a wireless communication function, that is capable of receiving input, processing the input, and generating output data. Additionally, the user devices 102(1)-102(3) may comprise different types of devices. For example, in FIG. 1, the user device 102(1) may be a wireless mobile device that is configured to collect real world data, and the user devices 102(2) and 102(3) may be HMDs or other types of playback devices.

The user devices 102(1)-102(3) may be equipped with a display and a touch-sensitive surface or touch-less user input device with which a user can interact. The user devices 102(1)-102(3) may present options for the user to select, controls for the user to actuate, and/or cursors or other indicators for the user to direct. The user devices 102(1)-102(3) may further accept data entry from the user. The user devices 102(1)-102(3) may further execute one or more software or firmware applications in response to user commands. These applications may configure the user devices 102(1)-102(3) to perform various customized functions in response to user interactions. For example, the user devices 102(2) and 102(3) may be configured to execute the XR application 104. Examples of XR applications 104 include architecture, visual art, commerce, education, emergency services, video games, medical, military, navigation, and workplace applications. Accordingly, the user devices 102(2) and 102(3) may generally comprise a central processing unit (CPU) and graphics processing unit (GPU) that may be configured to execute the XR application 104 to provide XR experiences within a virtual environment representing a real-world environment.

In FIG. 1, the user device 102(1) may be operated by a user in a real-world location. The user devices 102(2) and 102(3) may be operated by different users in another real-world location. The user device 102(1) may be configured to record a live event and associated spatial data in the real-world location. The recording may include data that is associated with both physical world and virtual world interactions. In one example, the data that is associated with the physical world may include video data and audio data to reconstruct and render a scene from a viewpoint of the user of the user device 102(1). With respect to such video data, a number of digital images from the user's viewpoint are output or displayed on the user devices 102(2) and 102(3) to enable other users to perceive a captured scene from any location and the first user's viewpoint.

The data that is associated with the physical world may also include six degrees of freedom (six-dof) data and gyroscopic data. In one aspect, the user devices 102(1) may be equipped with various sensors and/or may be operatively connected to external devices to collect such data. For example, the user device 102(1) may comprise a three-dimensional (3D) coordinate measuring system that may include a six-dof unit to detect user input and interpret movements (e.g., left, right, forward, backward, up, down) and/or rotations (e.g., yaw, pitch, roll). The 3D coordinate measuring system may interface with a touch-sensitive input device or a touchless user interface (TUI) device that may be a component of the user device 102(1) or an external spatial device (e.g., controller 106) that is paired with the user device 102(1). In some aspects, the 3D coordinate measuring system may also determine the relative positions among the user device 102(1), the controller 106 (e.g., a hand controller, a remote, etc.), and/or one or more spatial devices operated by a user.

In some examples, the user may operate a vehicle 108 (e.g., cars trucks, motorcycles, motorbikes, scooters, boats, recreational vehicles, or any other type of vehicle capable of being operated or driven by a vehicle operator), equipment, machinery, instruments, and/or so forth. Accordingly, the data that is associated with the physical world may also include vehicle telematics data. The vehicle telematics data may comprise vehicle operation data or behavioral data such as speed, lateral and longitudinal acceleration, revolutions per minute (RPM), steering data, throttle data, video and/or audio data collected by a camera or other type of recording device, or other data associated with vehicle operation, such as trip-based data such as GPS location, time of day, day of the week, road conditions, weather, or other information about the trip. Accordingly, the vehicle 108 may be equipped with sensors capable of detecting and storing one or more of the various types of telematics data. For instance, the sensors may comprise an accelerometer for measuring the acceleration of the vehicle 108. Additionally, or alternatively, the vehicle 108 may be equipped with the controller 106. The controller 106 and/or the sensors may also be configured to interface with the user device 102(1) for transmitting the telematics data.

The user devices 102(1)-102(3) are connected to a telecommunication network utilizing one or more wireless base stations or any other common wireless or wireline network access technologies. The network 112 can be a cellular network that implements 2G, 3G, 4G, 5G, and long-term evolution (LTE), LTE advanced, high-speed data packet access (HSDPA), evolved high-speed packet access (HSPA+), universal mobile telecommunication system (UMTS), code-division multiple access (CDMA), global system for mobile communications (GSM), a local area network (LAN), a wide area network (WAN), and/or a collection of networks (e.g., the Internet).

The user device 102(1) may communicate with an access network over a physical communications interface or layer, shown in FIG. 1 as an air interface 114 and/or a direct-wired connection. The air interface 114 can comply with a given cellular communications protocol. Additionally, the user devices 102(2) and 102(3) may communicate with the access network over an additional air interface 120 that can comply with a wireless Internet Protocol (e.g., Wi-Fi, IEEE 802.11). The access network may comprise a Radio Access Network (RAN) such as RAN 118 that serves the user devices 102(2) and 102(3) over the air interface 120. The RAN may include a plurality of access points (APs) such as AP 116 that serve the user device 102(1) over the air interface 114, access nodes (ANs), and base stations (BSs, Node Bs, eNode Bs, gNb, etc.). These access points can be terrestrial access points (or ground stations), or satellite access points.

The RAN 118 is configured to connect to a core network that can perform a variety of functions and support one or more communication services, including bridging circuit-switched (CS) calls between user devices served by the RAN 118 and other user devices served by a different RAN, and can also mediate an exchange of packet-switched (PS) data with external networks such as the Internet. In various embodiments, the user devices 102(1)-102(3) may connect to the Internet directly (i.e., separate from the core network, such as over an Ethernet connection of a Wi-Fi or an 802.11-based network). The Internet can thereby function to bridge packet-switched data communications among the user devices 102(1)-102(3) via the core network.

Multimedia data streams 110(1)-110(3) from one or more devices may be transmitted to a content delivery system 134 via a communication channel. In FIG. 1, the content delivery system 134 may implement a combiner 122, at which the data streams 110(1)-110(3) may be compiled. The combiner 122 may be configured to generate a combined data stream 124. The combined data stream 124 may be provided in a consolidated file format. The combined data stream 124 may comprise multiple video data, audio data, spatial data, sensor data, and/or other real-world data captured from the recorded live event. In FIG. 1, a first data stream 110(1) from the recorded live event may be transmitted from the user device 102(1). A second data stream 110(2) from the recorded live event may be transmitted from the controller 106. A third data stream 110(3) from the recorded live event may be transmitted from the vehicle 108. The data streams 110(1)-110(3) may have substantially the same timing characteristics. Accordingly, the combiner 122 may be configured to combine data from the first data stream 110(1), the second data stream 110(2), and the third data stream 110(3) based at least on the timing characteristics such as frequency and phase.

The content delivery system 134 may also implement an encoder 126 and a decoder 130. In some aspects, the combined data stream 124 may be compressed via the encoder 126. The encoder 126 may apply codec functionality that may convert the data signals in analog form to digital form (i.e., encoded bitstream) for transmission, storage, or encryption. The compressed data stream 128 may be transmitted via a transmitter to the decoder 130, which may comprise a receiver. The decoder 130 is configured to decompress the compressed data stream 128. In this regard, the decoder 130 may apply codec functionality to decode the encoded bitstream for playback via the user devices 102(2) and 102(3) and/or other XR-enabled computing devices (e.g., simulator devices, playback devices) that may be operated by additional users. The procedure selected for generating decoding instructions is selected based at least on the specific technique used to encode the compressed data stream. In this regard, the decoder 130 may be configured to determine a compression format of the compressed data bitstream.

In some aspects, the user devices 102(2) and 102(3) may communicate with a streaming component to request playback of live events. In response to the request, the decompressed data stream may be transmitted to the user devices 102(2) and 102(3). The user devices 102(2) and 102(3) may reconstruct the recorded live event in real-time or near real-time in an XR environment via the XR application 104. In some aspects, the user devices 102(2) and 102(3) may include simulator devices such as biking equipment (e.g., a stationary bicycle) that are configured to create the motion of moving up and down a bike path while users are riding on the equipment based at least on spatial data (e.g., left, right, forward, backward, upward, and/or downward movements and/or rotations) and/or telematics data (e.g., length of travel time, distance traveled, etc.).

The user devices 102(2) and 102(3) may also be different types of devices. In one example, the user device 102(2) may be an HMD and the 102(3) may be a stationary bicycle. Accordingly, the individual user devices 102(2) and 102(3) may receive different data streams. For instance, the user device 102(2) may receive a decompressed data stream comprising video data and audio data, and the user device 102(3) may receive a decompressed data stream comprising spatial data and telematics data. Therefore, a user may utilize multiple user devices 102(2) and 102(3) to stream various types of data may be used together to recreate experiences such as a live race from a racer's viewpoint in an XR environment in which the user can participate.

The participation level may vary, depending on embodiments. For instance, a user may passively observe the live event via the user devices 102(2) and 102(3). Additionally, or alternatively, the user may actively participate, for example, in a race. In this regard, the XR application 104 may be configured to collect the user's performance metrics in the virtual race that may be measured against the performances of other racers that participated in the race. In some aspects, the user's performance metrics may be saved to measure the user's improvements over time.

In some aspects, the user devices 102(2) and 102(3) may be grouped into a group profile. Accordingly, the user device 102(1), the controller 106, and the vehicle 108, when sending uploads of the data streams 110(1)-110(3), may specify a group identifier corresponding to a group profile instead of having to name specific media local area networks as destinations. The group identifier may also be associated with individual user devices 102(2) and 102(3), user account information, user profile, and/or so forth.

In some aspects, the compressed data stream 128 may be transmitted to a management server 132, which may, after locating a database table entry, forward the compressed data stream 128 to the decoder 130 that is operatively connected to the user devices 102(2) and 102(3) that are requesting playback. Accordingly, the user device 102(1), the controller 106, and/or the vehicle 108 at one end of the communication channel may not address the data streams 110(1)-110(3) to a specific destination user device and may rely on the management server 136 to handle forwarding of the data streams 110(1)-110(3). For instance, the management server 136 may direct the first data stream 110(1) from the first user device 102(1) to the second user device 102(2) and direct the second data stream 110(2) from the controller 106 to the third user device 102(3).

In some aspects, the user device 102(1), the controller 106, and the vehicle 108 may record the live event in one format and the user devices 102(2) and 102(3) that later play the live event may use a different format. In some aspects, the decoder 130 may apply codec functionality that may decompress the compressed data stream 128 for playback via multiple user devices 102(2)-102(3) using different formats. In this regard, the management server 132 may facilitate the transcoding of the compressed data stream 128 from the format in which the data streams 110(1)-110(3) were received to the format compatible with the destination user devices 102(2) and 102(3). For instance, the management server 132 may, after locating a database table entry, select the format based at least on the user devices 102(2) and 102(3) requesting playback.

Exemplary Computing Device Components

Figure 2:
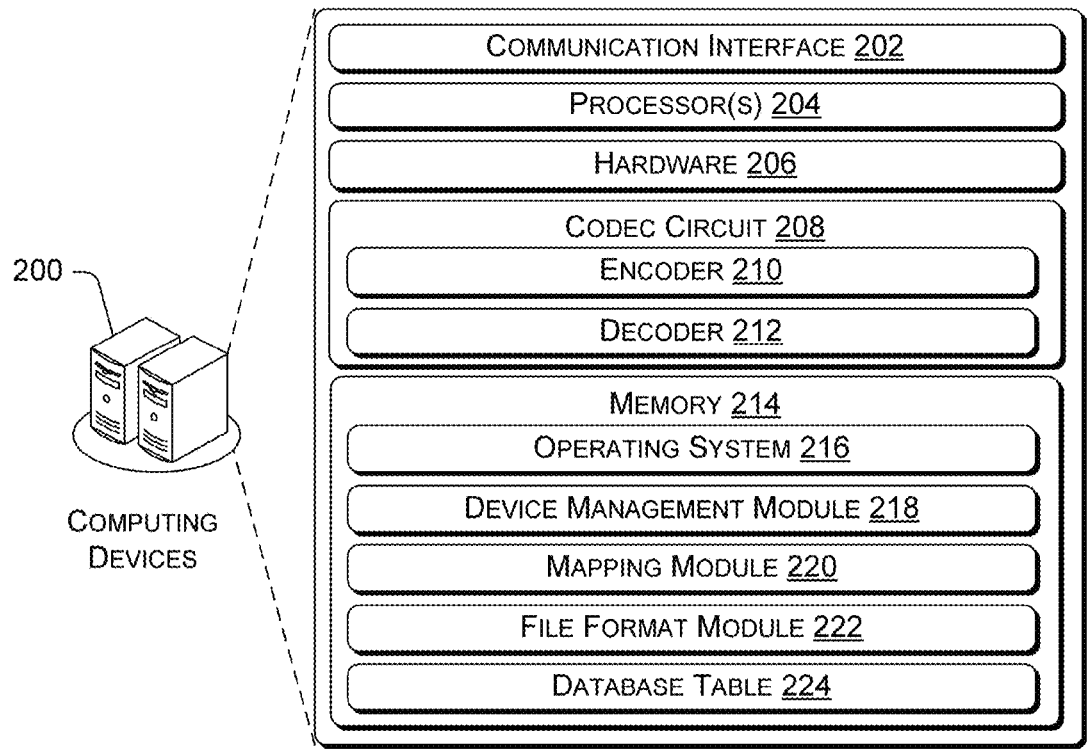
FIG. 2 is a block diagram showing various components of an illustrative computing device of a content delivery system that implements encoding and decoding of telematic and environmental data of live events.

FIG. 2 is a block diagram showing various components of illustrative computing devices 200. In some aspects, the computing devices 200 may be a component of a content delivery system. It is noted that the computing devices 200 as described herein can operate with more or fewer of the components shown herein. Additionally, the computing devices 200 as shown herein or portions thereof can serve as a representation of one or more of the computing devices of the present system.

The computing devices 200 may include a communication interface 202, one or more processors 204, hardware 206, and memory 214. The communication interface 202 may include wireless and/or wired communication components that enable the computing devices 200 to transmit data to and receive data from other networked devices. In at least one example, the one or more processor(s) 204 may be a central processing unit(s) (CPU), graphics processing unit(s) (GPU), both a CPU and GPU or any other sort of processing unit(s). Each of the one or more processor(s) 204 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution.

The one or more processor(s) 204 may also be responsible for executing all computer applications stored in the memory, which can be associated with common types of volatile (RAM) and/or nonvolatile (ROM) memory. The hardware 206 may include an additional user interface, data communication, or data storage hardware. For example, the user interfaces may include a data output device (e.g., visual display, audio speakers), and one or more data input devices. The data input devices may include but are not limited to, combinations of one or more keypads, keyboards, mouse devices, touch screens that accept gestures, microphones, voice or speech recognition devices, and any other suitable devices. Additionally, the processor(s) 204 may be connected to a codec circuit 208, wherein the codec circuit 208 may be configured to perform encoding and decoding of real-world data (i.e., via an encoder 210 and a decoder 212, respectively) or to assist in the encoding and decoding performed by the processor 204. In one aspect, the encoder and decoder may include a data generator component that may be configured to generate a data structure having a file format (e.g., a file format to store data that is decompressed). For example, the data generator component may generate a data structure based at least on the decoding performed by the Huffman decoder. The data structures may be merged and/or decoded to obtain the decompressed data file.

The memory 214 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 214 may also include a firewall. In some embodiments, the firewall may be implemented as hardware 206 in the computing devices 200.

The processor(s) 204 and the memory 214 of the computing devices 200 may implement an operating system 216, a device management module 218, a mapping module 220, and a file format module 222. The operating system 210 may include components that enable the computing devices 200 to receive and transmit data via various interfaces (e.g., user controls, communication interface, and/or memory input/output devices), as well as process data using the processor(s) 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The device management module 218, the mapping module 220, and the file format module 222 may include routines, program instructions, objects, and/or data structures that perform particular tasks or implement particular abstract data types. For example, the device management module 218 may include one or more instructions which, when executed by the one or more processors 204, direct the computing devices 200 to perform operations related to detecting playback devices and registering the detected playback devices. Discovery and management of playback devices may be performed by the communication interface 202. The device management module 218 may discover playback devices on a network in a variety of different ways. For example, a user device that is functioning as a playback device may broadcast its presence and its role as a playback device and compatible devices may respond with device identifiers that allow the playback device to establish a connection. In some embodiments, a gateway device may employ several methods to detect all compatible playback devices. Additionally, the gateway may be loaded with a group identifier that may be associated with a device identifier to establish a connection.

In some aspects, a playback device may be associated with a user profile and a user account. The user profile may indicate that the user is an observer, a participant, and/or other types of users that operate the playback device. The user profile may also indicate the user's participation level (e.g., observer). Based at least on the user profile that is associated with the playback device, the device management module 218 may designate a user device as a playback device even if its role is not broadcasted during the discovery of the playback device.

Additionally, the device management module 218 may include one or more instructions which, when executed by the one or more processors 204, direct the computing devices 200 to perform operations related to detecting user devices and controllers, sensors, and/or other equipment operated with the user devices and registering the detected such devices. In some aspects, discovery and management of user devices may be performed by the communication interface 202. The device management module 218 may discover user devices on a network in a variety of different ways. For example, a user device may broadcast its presence and its role as a non-playback device and compatible devices may respond with device identifiers that allow the user device to establish a connection. Because the user device is not functioning as a playback device, the user device may be configured to collect and record live events and associated data. In some embodiments, a gateway device may employ several methods to detect all compatible user devices. Upon registering a user device, the device management module 218 may permit the communication interface 202 to receive a multimedia data stream from the user device.

The mapping module 220 may include one or more instructions which, when executed by the one or more processors 204, direct the computing devices 200 to perform operations related to identifying device configurations associated with individual playback devices that are registered in the network. In some aspects, the mapping module 220 may reference a database table 224. The database table 224 may comprise playback device identifiers, associated group identifiers, user profile, user account, and/or settings associated with playback devices that establish criteria used in determining device compatibility and capability, performing authentication, and/or so forth. In one aspect, one or more playback devices may be grouped into a group profile. In this regard, the mapping module 220 may identify a device identifier based at least on the group identifier that is associated with the group profile and one or more playback devices. Accordingly, a user device, when sending a multimedia data stream, may specify a group identifier instead of having to name specific device identifiers as destinations.

The file format module 222 may include one or more instructions which, when executed by the one or more processors 204, direct the computing devices 200 to perform operations related to converting a multimedia data format into a target file format. In one aspect, the file format module 222 may determine a first multimedia streaming data format. After locating a database table entry for a requesting playback device via the mapping module 220, the file format module 222 may determine the compatible file format for the playback device. Upon determining the compatible file format, the file format module 222 may convert the multimedia streaming data format into the compatible file format. Accordingly, the file format module 222 may receive a multimedia data stream from the live event in one file format and transmit it to a playback device that later plays the live event using a different format.

Example Processes

Figure 3:
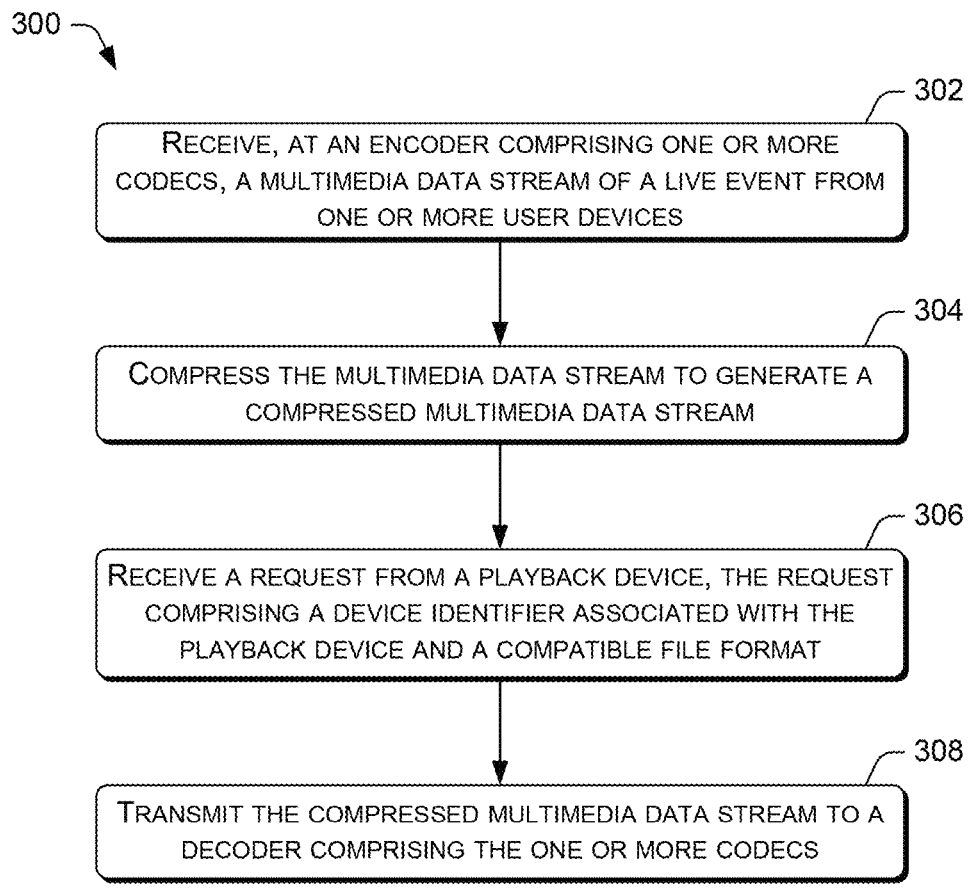
FIG. 3 is a flow diagram of an example process for encoding and decoding telematic and environmental data of live events.
Figure 4:
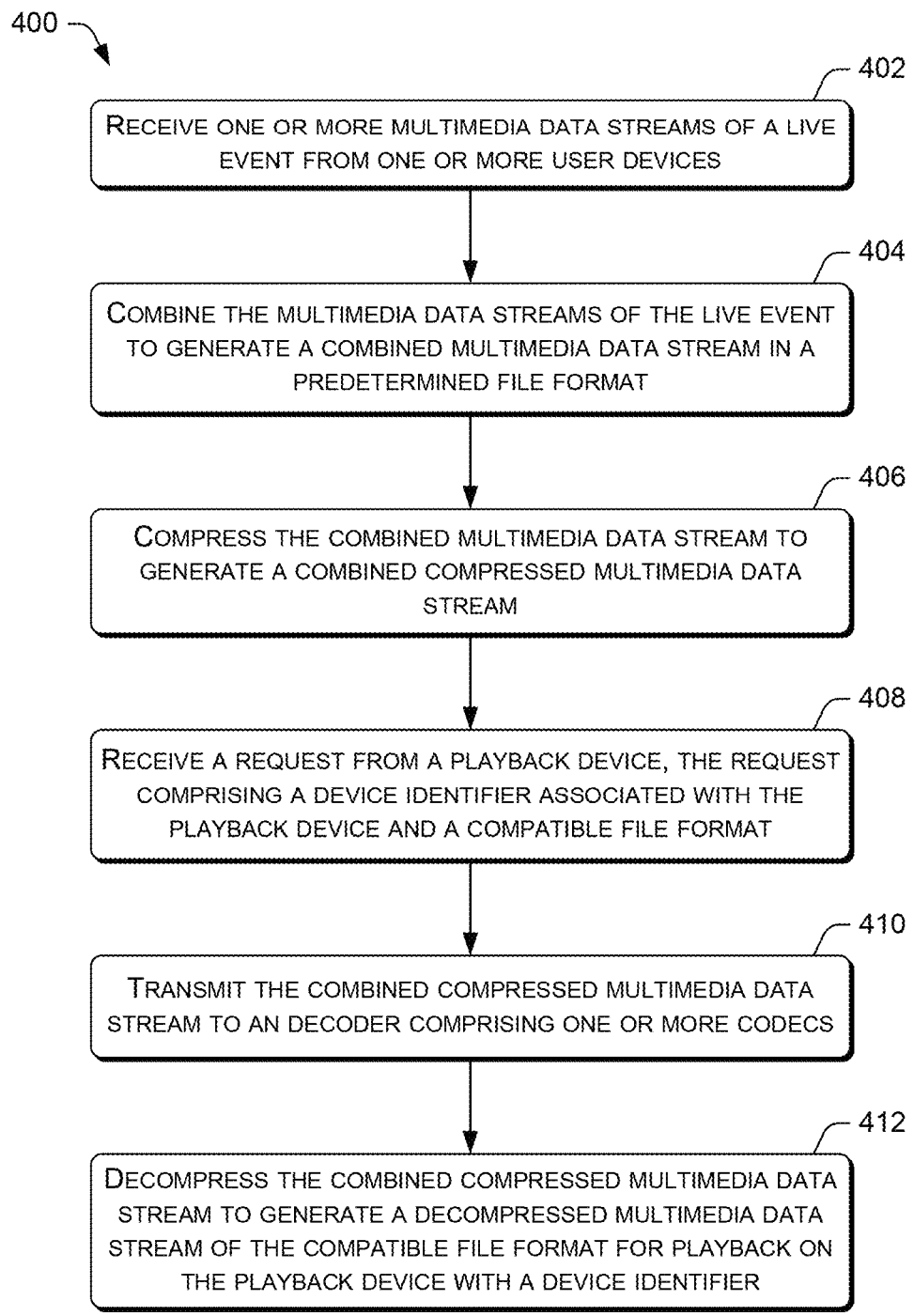
FIG. 4 is a flow diagram of an example process for combining multimedia data streams.

FIGS. 3 and 4 present illustrative processes 300 and 400 for delivering telematic and environmental data of live events to provide immersive experiences. The processes 300 and 400 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, processes 300 and 400 are described with reference to FIGS. 1 and 2.

FIG. 3 is a flow diagram of an example process 300 for encoding and decoding telematic and environmental data of live events. At block 302, an encoder of a content delivery system may receive a multimedia data stream of a live event from one or more user devices. The encoder may comprise one or more codecs. The multimedia data stream may include video data, audio data, telematics data, spatial data, including movement data, and gyroscopic data, sensor data, and/or so forth. The telematics data may be received in real-time from a vehicle that may be equipped with various sensor devices. Similarly, the spatial data is may be represented via XYZ coordinates, which may be collected via an HMD, a controller, and/or other devices.

At block 304, the encoder may compress the multimedia data stream to generate a compressed multimedia data stream. The encoder may apply codec functionality that may compress the data stream for transmission, storage, or encryption. At block 306, the content delivery system may receive a request from a playback device, wherein the request may comprise a device identifier associated with the playback device and a compatible file format. The playback device may comprise simulator devices that may be worn on a user such as an HMD. In some aspects, the playback device may be paired to additional playback devices that may operate together. At block 308, the content delivery system may transmit the compressed multimedia data stream to a decoder that comprises the one or more codecs. The decoder is configured to decompress the compressed data stream. In this regard, the decoder may apply codec functionality to decode the encoded bitstream for playback via the playback device.

FIG. 4 is a flow diagram of an example process 400 for combining multimedia data streams. At block 402, one or more multimedia data streams of a live event from one or more user devices may be compiled at a combiner of a content delivery system. The user devices may include handheld devices such as a mobile device that is configured to execute an XR application, wearable devices such as a body camera, or other sensors that can be mounted on vehicles or equipment. At block 404, the combiner of the content delivery system may combine the multimedia data streams of the live event to generate a combined multimedia data stream in a predetermined file format. In some aspects, the combiner may be configured to combine data from the data streams based at least on the timing characteristics such as frequency and phase.

At block 406, an encoder comprising one or more codecs may compress the combined multimedia data stream to generate a combined compressed multimedia data stream. The encoder may apply codec functionality that may compress the data stream for transmission, storage, or encryption. At block 408, the content delivery system may receive a request from a playback device. The request may comprise a device identifier that is associated with the playback device and a compatible file format. Accordingly, in some embodiments, the compressed multimedia data stream may be passed to a management layer that is configured to serve requests for playback from one or more playback devices.

At block 410, the content delivery system may transmit the combined compressed multimedia data stream to a decoder comprising the one or more codecs. At block 412, the decoder may decompress the combined compressed multimedia data stream to generate a decompressed multimedia data stream of the compatible file format for playback on the playback device with a device identifier. The procedure selected for generating decoding instructions is selected based at least on the specific technique used to encode the compressed data stream. In this regard, the decoder may be configured to determine a compression format of the compressed data bitstream. In some aspects, the playback device may be configured to provide a virtual experience. Additionally, the playback device may be operatively connected to additional playback devices in order to enhance an immersive experience.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:

receiving, at an encoder comprising one or more codecs, a multimedia data stream of a live event from one or more user devices, the one or more user devices including a user device that broadcasts a presence of the user device as a non-playback device on a network to discover one or more extended reality (XR)-enabled playback devices connected to the network that are configured to provide an immersive experience to a user based at least on the multimedia data stream;

compressing the multimedia data stream to generate a compressed multimedia data stream;

receiving a request from an XR-enabled playback device of the one or more XR-enabled playback devices, the request comprising a device identifier associated with the XR-enabled playback device; and transmitting the compressed multimedia data stream to a decoder comprising the one or more codecs.

2. The one or more non-transitory computer-readable media of claim 1, wherein the acts further comprise:

receiving an additional multimedia data stream of the live event from the one or more user devices;

combining the multimedia data stream and the additional multimedia data stream of the live event to generate a combined multimedia data stream in a predetermined file format;

compressing the combined multimedia data stream to generate a combined compressed multimedia data stream;

receiving an additional request from the XR-enabled playback device; and transmitting the combined compressed multimedia data stream to the decoder comprising the one or more codecs.

3. The one or more non-transitory computer-readable media of claim 1, wherein the request from the XR-enabled playback device further comprises a compatible file format, and wherein the acts further comprise:

decompressing the compressed multimedia data stream to generate a decompressed multimedia data stream of the compatible file format for playback on the XR-enable playback device with the device identifier.

4. The one or more non-transitory computer-readable media of claim 1, wherein the multimedia data stream comprises at least one of video data, audio data, spatial data, telematics data, and sensor data.

5. The one or more non-transitory computer-readable media of claim 1, wherein the one or more user devices are configured to capture physical world data comprising at least one of telematics data, gyroscopic data, and six degrees of freedom (six-dof) data.

6. The one or more non-transitory computer-readable media of claim 1, and wherein the acts further comprise:

determining a compatible file format for the XR-enabled playback device via a database that stores device settings for the XR-enabled playback device; and decompressing the compressed multimedia data stream to generate a decompressed multimedia data stream of the compatible file format for playback on the XR-enable playback device with the device identifier.

7. The one or more non-transitory computer-readable media of claim 1, wherein the device identifier is associated with a device group identifier, the device group identifier associated with one or more destination devices paired with the XR-enabled playback device, wherein the acts further comprise:

delivering the multimedia data stream to individual destination devices based at least on device capabilities of the individual destination devices.

8. A computer-implemented method, comprising:

receiving, at an encoder comprising one or more codecs, a multimedia data stream of a live event from one or more user devices, the one or more user devices including a user device that broadcasts a presence of the user device as a non-playback device on a network to discover one or more extended reality (XR)-enabled playback devices connected to the network that are configured to provide an immersive experience to a user based at least on the multimedia data stream;

compressing the multimedia data stream to generate a compressed multimedia data stream;

receiving a request from an XR-enabled playback device of the one or more XR-enabled playback devices, the request comprising a device identifier associated with the XR-enabled playback device; and transmitting the compressed multimedia data stream to a decoder comprising the one or more codecs.

9. The computer-implemented method of claim 8, further comprising:

receiving an additional multimedia data stream of the live event from the one or more user devices;

combining the multimedia data stream and the additional multimedia data stream of the live event to generate a combined multimedia data stream in a predetermined file format;

compressing the combined multimedia data stream to generate a combined compressed multimedia data stream;

receiving an additional request from the XR-enabled playback device; and transmitting the combined compressed multimedia data stream to the decoder comprising the one or more codecs.

10. The computer-implemented method of claim 8, wherein the request from the XR-enabled playback device further comprises a compatible file format, further comprising:

decompressing the compressed multimedia data stream to generate a decompressed multimedia data stream of the compatible file format for playback on the XR-enabled playback device with the device identifier.

11. The computer-implemented method of claim 10, wherein the multimedia data stream comprises at least one of video data, audio data, spatial data, telematics data, and sensor data.

12. The computer-implemented method of claim 10, wherein the one or more user devices are configured to capture physical world data comprising at least one of telematics data, gyroscopic data, and six degrees of freedom (six-dof) data.

13. The computer-implemented method of claim 10, wherein the XR-enabled playback device is associated with a user profile and a user account.

14. The computer-implemented method of claim 8, wherein the multimedia data stream is processed via a first codec of the one or more codecs and the compressed multimedia data stream is processed via a second codec of the one or more codecs.

15. A system, comprising:

one or more non-transitory storage mediums configured to provide stored computer-readable instructions, the one or more non-transitory storage mediums coupled to one or more processors, the one or more processors configured to execute the computer-readable instructions to cause the one or more processors to:

receive, at an encoder comprising one or more codecs, a multimedia data stream of a live event from one or more user devices, the one or more user devices including a user device that broadcasts a presence of the user device as a non-playback device on a network to discover one or more extended reality (XR)-enabled playback devices connected to the network that are configured to provide an immersive experience to a user based at least on the multimedia data stream;

compress the multimedia data stream to generate a compressed multimedia data stream;

receive a request from an XR-enabled playback device of the one or more XR-enabled playback devices, the request comprising a device identifier associated with the playback device; and transmit the compressed multimedia data stream to a decoder comprising the one or more codecs.

16. The system of claim 15, wherein the one or more processors are further configured to:

receive an additional multimedia data stream of the live event from the one or more user devices;

compress the additional multimedia data stream to generate an additional compressed multimedia data stream;

combine the compressed multimedia data stream and the additional compressed multimedia data stream of the live event to generate a combined compressed multimedia data stream;

receive an additional request from the XR-enabled playback device; and transmit the combined compressed multimedia data stream to the decoder comprising the one or more codecs.

17. The system of claim 15, wherein the request from the XR-enabled playback device further comprises a compatible file format, and wherein the one or more processors are further configured to:

decompress the compressed multimedia data stream to generate a decompressed multimedia data stream of the compatible file format for playback on the XR-enabled playback device with the device identifier.

18. The system of claim 15, wherein the multimedia data stream comprises at least one of video data, audio data, spatial data, telematics data, and sensor data.

19. The system of claim 15, wherein the one or more user devices are configured to capture physical world data comprising at least one of telematics data, gyroscopic data, and six degrees of freedom (six-dof) data.

20. The system of claim 15, wherein the device identifier is associated with a device group identifier, the device group identifier associated with one or more destination devices paired with the XR-enabled playback device, wherein the one or more processors are further configured to:

deliver the multimedia data stream to individual destination devices based at least on device capabilities of the individual destination devices.

* * * * *